US012789800B2

(12) United States Patent
Kameda et al.

(10) Patent No.: US 12,789,800 B2
(45) Date of Patent: Nov. 10, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Ryota Kameda, Tokyo (JP); Sho Tamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/050,146

(22) Filed: Feb. 11, 2025

(65) Prior Publication Data

US 2025/0304057 A1 Oct. 2, 2025

(30) Foreign Application Priority Data

Mar. 27, 2024 (JP) ................................ 2024-051061

(51) Int. Cl.
*B60W 30/12* (2020.01)
*G06V 20/56* (2022.01)

(52) U.S. Cl.
CPC ........... *B60W 30/12* (2013.01); *G06V 20/588* (2022.01); *B60W 2420/403* (2013.01);
(Continued)

(58) Field of Classification Search
CPC ........... B60W 30/12; B60W 2420/403; B60W 2520/10; B60W 2552/53; B60W 2556/40;
(Continued)

(56) References Cited

U.S. PATENT DOCUMENTS

2016/0129938 A1 5/2016 Okuda
2016/0288707 A1 10/2016 Matsumura
(Continued)

FOREIGN PATENT DOCUMENTS

JP 2015-020666 2/2015
JP 2016-081462 5/2016
(Continued)

OTHER PUBLICATIONS

Machine Translation of JP7010981B2 PDF File Name: "JP7010981B2_Machine_Translation.pdf" (Year: 2022).*
(Continued)

*Primary Examiner* — Grant Moubry
*Assistant Examiner* — Ruben Picon-Feliciano
(74) *Attorney, Agent, or Firm* — Amin, Turocy & Watson, LLP

(57) ABSTRACT

A vehicle control device includes a storage medium that stores computer-readable instructions, and a processor connected to the storage medium, in which the processor executes the computer-readable instructions to recognize a road marking present in a moving direction of a vehicle, determine whether the recognized road marking and a map road marking based on map information stored in a storage unit match each other and determine a deviation between the road marking and the map road marking matching each other, and perform traveling control of the vehicle, and the processor changes a condition for determining the deviation according to a speed of the vehicle.

7 Claims, 7 Drawing Sheets

(52) U.S. Cl.
CPC ..... *B60W 2520/10* (2013.01); *B60W 2552/53* (2020.02); *B60W 2556/40* (2020.02)

(58) Field of Classification Search
CPC ............... B60W 60/001; B60W 40/06; B60W 60/0015; B60W 2420/408; G06V 20/588
See application file for complete search history.

(56) References Cited

U.S. PATENT DOCUMENTS

| | | | |
|---|---|---|---|
| 2023/0115708 | A1 | 4/2023 | Xiang et al. |
| 2023/0303099 | A1 | 9/2023 | Inoue et al. |

FOREIGN PATENT DOCUMENTS

| | | | |
|---|---|---|---|
| JP | 2016-148893 | | 8/2016 |
| JP | 2016-193683 | | 11/2016 |
| JP | 7010981 | B2 * | 1/2022 |
| JP | 2023-139737 | | 10/2023 |
| WO | 2022/009900 | | 1/2022 |

OTHER PUBLICATIONS

Japanese Office Action for Japanese Patent Application No. 2024-051061 mailed Sep. 16, 2025.

* cited by examiner

FIG. 2

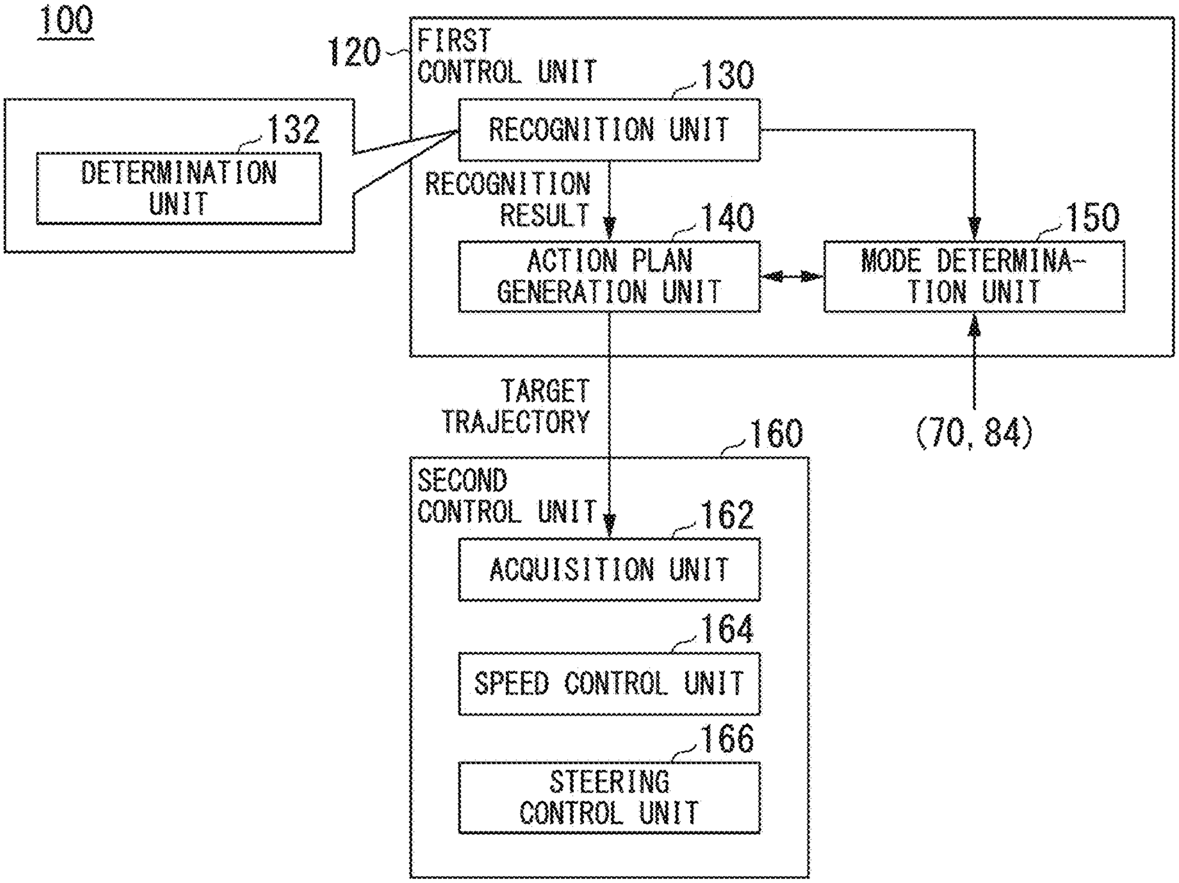

FIG. 3

| DRIVING MODE | CONTROL STATE | TASK |
|---|---|---|
| MODE A | AUTONOMOUS DRIVING | FRONT MONITORING: NOT REQUIRED<br>STEERING GRIPPING: NOT REQUIRED |
| MODE B | DRIVING ASSISTANCE | FRONT MONITORING: REQUIRED<br>STEERING GRIPPING: NOT REQUIRED |
| MODE C | DRIVING ASSISTANCE | FRONT MONITORING: REQUIRED<br>STEERING GRIPPING: REQUIRED |
| MODE D | DRIVING ASSISTANCE | FRONT MONITORING: REQUIRED<br>AT LEAST DRIVING OPERATION OF CERTAIN DEGREE IS REQUIRED |
| MODE E | MANUAL DRIVING | FRONT MONITORING: REQUIRED<br>DRIVING OPERATION IS REQUIRED IN RELATION TO BOTH STEERING AND ACCELERATION/DECELERATION |

TASK: LIGHT
TASK: HEAVY

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2024-051061, filed on Mar. 27, 2024, the contents of which are incorporated herein by reference.

BACKGROUND

Field of the Invention

The present invention relates to a vehicle control device, a vehicle control method, and a storage medium.

Description of Related Art

In recent years, efforts have been actively made to provide access to a sustainable transportation system with special attention to people in vulnerable situations among traffic participants. To implement this, research and development for further improving the safety or convenience of traffic through research and development regarding an autonomous driving technique has been focused on.

Incidentally, in the autonomous driving technique, matching of a road marking (hereinafter, referred to as a camera road marking) recognized from a camera image and a road marking (hereinafter, referred to as a map road marking) recognized from map information is confirmed, and a lane width of a lane on which a host vehicle is traveling is estimated on the basis of the matched road markings on both sides or on one side. For example, Japanese Unexamined Patent Application, First Publication No. 2016-148893 discloses that, in a case where a road marking of a lane on which a host vehicle is traveling is detected on only one side, a lane width of the lane is estimated on the basis of the detected road marking and a basic lane width set in advance, and lane keeping control is continued.

However, in the related art, autonomous driving is not continued as appropriate in a case where a deviation is further generated between a camera road marking and a map road marking that match each other on only one side. As a result, in a case where a deviation is further generated between a camera road marking and a map road marking that match each other on only one side, lowering of the level of autonomous driving may be caused, and an occupant may feel discomfort.

SUMMARY

The present invention has been accomplished in consideration of such a situation, and one of objects of the present invention is to provide a vehicle control device, a vehicle control method, and a storage medium capable of appropriately continuing autonomous driving even in a case where a deviation is further generated between a camera road marking and a map road marking that match each other on only one side. The present invention, in turn, contributes to development of a sustainable transportation system.

A vehicle control device according to the invention employs the following configuration.

(1) A vehicle control device according to an aspect of the invention includes a storage medium that stores computer-readable instructions, and a processor connected to the storage medium, in which the processor executes the computer-readable instructions to recognize a road marking present in a moving direction of a vehicle, determine whether the recognized road marking and a map road marking based on map information stored in a storage unit match each other and determine a deviation between the road marking and the map road marking matching each other, and perform traveling control of the vehicle, and the processor changes a condition for determining the deviation according to a speed of the vehicle.

(2) In the aspect of (1) described above, the processor changes the condition such that the deviation is less likely to be determined in a case where the speed of the vehicle is low than in a case where the speed of the vehicle is high.

(3) In the aspect of (2) described above, the processor changes the condition such that the deviation is less likely to be determined, according to the speed of the vehicle in a case where the speed is equal to or lower than a first speed and equal to or higher than a second speed lower than the first speed, and sets the condition to be the same in a case where the sped is lower than the second speed.

(4) In the aspect of any one of (1) to (3) described above, in a state in which determination is made that the road marking and the map road marking match each other on only one side, the processor changes a condition for determining a deviation between the road marking and the map road marking on the one side.

(5) In the aspect of (4) described above, the condition has a first threshold regarding an angle difference between the road marking and the map road marking on the one side, and the processor changes the first threshold according to the speed.

(6) In the aspect of (5) described above, in a case where determination is made that the angle difference is equal to or greater than the first threshold, both a first angle difference between the road marking and the map road marking on the one side and a second angle difference between the road marking and the map road marking on the other side are equal to or greater than a second threshold, and the first angle difference and the second angle difference are angle differences in the same direction, the processor performs traveling control of the vehicle according to the recognized road marking.

(7) A vehicle control method according to another aspect of the invention includes, by a computer mounted in a vehicle, recognizing a road marking in a moving direction of the vehicle, determining whether the recognized road marking and a map road marking based on map information stored in a storage unit match each other, determining a deviation between the road marking and the map road marking matching each other, performing traveling control of the vehicle, and changing a condition for determining the deviation according to a speed of the vehicle.

(8) A storage medium according to still another aspect of the present invention stores a program for causing a computer mounted in a vehicle to recognize a road marking present in a moving direction of the vehicle, determine whether the recognized road marking and a map road marking based on map information stored in a storage unit match each other, determine a deviation between the road marking and the map road marking matching each other, performing traveling control of the vehicle, and changing a condition for determining the deviation according to a speed of the vehicle.

According to the aspect of (1) described above, it is possible to perform determination according to the vehicle speed and to appropriately determine whether to continue traveling control compared to a case where the same condition is set uniformly in determining the deviation.

According to the aspect of (2) described above, by making the condition for determining the deviation strict in a low-speed region where there is a sufficient time to spare until the vehicle departs from a lane, it is possible to prevent a situation in which traveling control is released instantaneously or the level is lowered.

According to the aspect of (3) described above, it is possible to prevent a situation in which traveling control with low accuracy is continued in a very low-speed region of the vehicle.

According to the aspect of (4) described above, it is possible to appropriately continue traveling control in contrast to in the related art in which traveling control is released or the level is lowered in a case where the road marking and the map road marking do not match each other on one side, and a deviation is generated between the road marking and the map road marking that match each other on the other side.

According to the aspect of (6) described above, in a case where determination is made that the road marking recognized by the recognition unit has a higher reliability than the map road marking while traveling control in the low-speed region is continued, it is possible to perform traveling control according to the road marking without using the map road marking.

According to the aspects of (1) to (8) described above, it is possible to appropriately continue autonomous driving even in a case where a deviation is further generated between the camera road marking and the map road marking that match each other on only one side.

BRIEF DESCRIPTION OF THE DRAWINGS

FIG. 2 is a functional configuration diagram of a first control unit and a second control unit.

FIG. 3 is a diagram illustrating a correspondence relationship of a driving mode, a control state of a host vehicle, and a task.

DESCRIPTION OF EMBODIMENTS

Hereinafter, an embodiment of a vehicle control device, a vehicle control method, and a storage medium of the present invention will be described with reference to the drawings.

Overall Configuration

Figure 1:
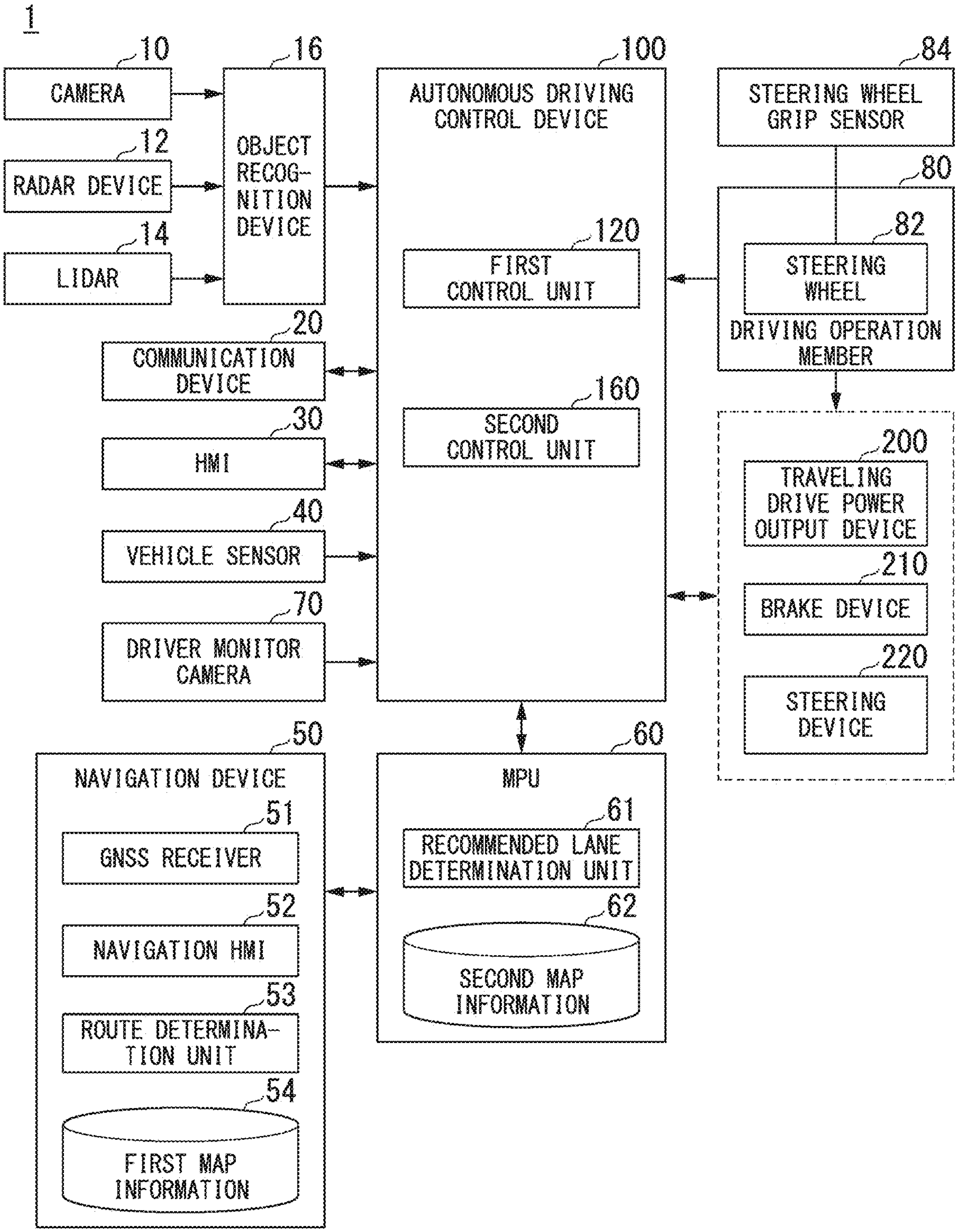
FIG. 1 is a configuration diagram of a vehicle system using a vehicle control device according to an embodiment.

FIG. 1 is a configuration diagram of a vehicle system 1 using the vehicle control device according to the embodiment. A vehicle in which the vehicle system 1 is mounted is, for example, a two-wheeled, three-wheeled, or four-wheeled vehicle, and a drive source thereof is an internal combustion engine such as a diesel engine or a gasoline engine, an electric motor, or a combination thereof. The electric motor operates using electric power generated by a generator coupled to the internal combustion engine or electric power discharged from a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitor camera 70, a driving operation member 80, an autonomous driving control device 100, a traveling drive power output device 200, a brake device 210, and a steering device 220. These devices and apparatuses are connected to each other by a multiplex communication line such as a controller area network (CAN) communication line, a serial communication line, or a wireless communication network. The configuration shown in FIG. 1 is merely an example, and a part of the configuration may be omitted or another configuration may be added.

The camera 10 is, for example, a digital camera using a solid-state imaging element such as a charge coupled device (CCD) or a complementary metal oxide semiconductor (CMOS). The camera 10 is attached at any place on a vehicle (hereinafter, referred to as a host vehicle M) in which the vehicle system 1 is mounted. In imaging the front, the camera 10 is attached to an upper portion of a front windshield, a back surface of a rear-view mirror, or the like. The camera 10 periodically and repeatedly images, for example, surroundings of the host vehicle M. The camera 10 may be a stereo camera.

The radar device 12 radiates radio waves such as millimeter waves to the surroundings of the host vehicle M, and detects radio waves (reflected waves) reflected by an object to detect at least a position of (a distance to and a direction of) the object. The radar device 12 is attached at any place on the host vehicle M. The radar device 12 may detect a position and a speed of an object by a frequency modulated continuous wave (FM-CW) method.

The LIDAR 14 irradiates the surroundings of the host vehicle M with light (or electromagnetic waves with a wavelength close to that of light) and measures scattered light. The LIDAR 14 detects a distance to a target on the basis of a time from light emission to light reception. The irradiation light is, for example, pulsed laser light. The LIDAR 14 is attached at any place on the host vehicle M.

The object recognition device 16 executes sensor fusion processing on detection results of a part or all of the camera 10, the radar device 12, and the LIDAR 14 to recognize a position, a type, a speed, and the like of an object. The object recognition device 16 outputs a recognition result to the autonomous driving control device 100. The object recognition device 16 may output the detection results of the camera 10, the radar device 12, and the LIDAR 14 to the autonomous driving control device 100 without change. The object recognition device 16 may be omitted from the vehicle system 1.

The communication device 20 communicates with another vehicle in the surroundings of the host vehicle M using, for example, a cellular network, a Wi-Fi network, Bluetooth (Registered Trademark), or dedicated short range communication (DSRC) or communicates with various server devices via a wireless base station.

The HMI 30 presents various kinds of information to an occupant of the host vehicle M, and receives an input operation by the occupant. The HMI 30 includes various display devices, a speaker, a buzzer, a touch panel, a switch, keys, and the like.

The vehicle sensor 40 includes a vehicle speed sensor that detects a speed of the host vehicle M, an acceleration sensor that detects an acceleration, a yaw rate sensor that detects an angular velocity around a vertical axis, an azimuth sensor that detects a direction of the host vehicle M, and the like.

The navigation device 50 includes, for example, a global navigation satellite system (GNSS) receiver 51, a navigation HMI 52, and a route determination unit 53. The navigation device 50 stores first map information 54 in a storage device such as a hard disk drive (HDD) or a flash memory. The GNSS receiver 51 specifies a position of the host vehicle M on the basis of signals received from GNSS satellites. The position of the host vehicle M may be identified or completed by an inertial navigation system (INS) using an output of the vehicle sensor 40. The navigation HMI 52 includes a display device, a speaker, a touch panel, keys, and the like. The navigation HMI 52 may be partially or entirely shared with the HMI 30 described above. The route determination unit 53 determines a route (hereinafter, referred to as an on-map route) from the position of the host vehicle M specified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include a curvature of a road, point of interest (POI) information, or the like. The on-map route is output to the MPU 60. The navigation device 50 may perform route guidance using the navigation HMI 52 on the basis of the on-map route. The navigation device 50 may be implemented by, for example, a function of a terminal device such as a smartphone or a tablet terminal owned by the occupant. The navigation device 50 may transmit a current position and a destination to a navigation server via the communication device 20 and may acquire a route equivalent to the on-map route from the navigation server.

The MPU 60 includes, for example, a recommended lane determination unit 61, and stores second map information 62 in a storage device such as an HDD or a flash memory. The recommended lane determination unit 61 divides the on-map route provided from the navigation device 50 into a plurality of blocks (for example, divides the on-map route every 100 [m] in a vehicle moving direction), and determines a recommended lane for each block with reference to the second map information 62. The recommended lane determination unit 61 performs determination which lane from the left the vehicle travels on. When a branch point is present on the on-map route, the recommended lane determination unit 61 determines a recommended lane such that the host vehicle M can travel along a reasonable route for advancing to a branch destination.

The second map information 62 is map information with higher accuracy than the first map information 54. The second map information 62 includes, for example, information on a center of a lane, information on a boundary of a lane, or the like. The second map information 62 may include road information, traffic regulation information, address information (address or zip code), facility information, telephone number information, information on a prohibited section where a mode A or a mode B described below is prohibited, or the like. The second map information 62 may be updated at any time by the communication device 20 communicating with another device.

The driver monitor camera 70 is, for example, a digital camera using a solid-state imaging element such as a CCD or a CMOS. The driver monitor camera 70 is attached at any place on the host vehicle M in a position and a direction in which the head of an occupant (hereinafter, referred to as a driver) seated in a driver's seat of the host vehicle M is able to be imaged from the front (in a direction in which the face is imaged). For example, the driver monitor camera 70 is attached to an upper portion of a display device provided in a center portion of an instrument panel of the host vehicle M.

The driving operation member 80 includes, for example, an accelerator pedal, a brake pedal, a shift lever, and other operation members, in addition to a steering wheel 82. A sensor that detects an operation amount or the presence or absence of an operation is attached to the driving operation member 80, and a detection result thereof is output to the autonomous driving control device 100 or a part or all of the traveling drive power output device 200, the brake device 210, and the steering device 220. The steering wheel 82 is an example of an "operation member that receives a steering operation by the driver." The operation member is not necessarily in an annular shape, and may be in a form of a deformed steering wheel, a joystick, a button, or the like. A steering wheel grip sensor 84 is attached to the steering wheel 82. The steering wheel grip sensor 84 is implemented by a static capacitance sensor or the like, and outputs, to the autonomous driving control device 100, a signal capable of detecting whether the driver is gripping the steering wheel 82 (meaning that the driver is in contact with the steering wheel 82 in a state of applying force to the steering wheel 82).

The autonomous driving control device 100 includes, for example, a first control unit 120 and a second control unit 160. Each of the first control unit 120 and the second control unit 160 is implemented by, for example, a hardware processor such as a central processing unit (CPU) executing a program (software). A part or all of these components may be implemented by software (circuit part, including circuitry) such as large scale integration (LSI), an application specific integrated circuit (ASIC), a field-programmable gate array (FPGA), a graphics processing unit (GPU), or a system on chip (SOC), or may be implemented by software and hardware in cooperation. The program may be stored in advance in a storage device (a storage device including a non-transitory storage medium) such as an HDD or a flash memory of the autonomous driving control device 100 or may be stored in a removable storage medium such as a DVD or a CD-ROM and may be installed on the HDD or the flash memory of the autonomous driving control device 100 when the storage medium (non-transitory storage medium) is loaded into a drive device. The autonomous driving control device 100 including a determination unit 132 and a correction unit 134 described below is an example of a "vehicle control device".

FIG. 2 is a functional configuration diagram of the first control unit 120 and the second control unit 160. The first control unit 120 includes, for example, a recognition unit 130, a determination unit 132, an action plan generation unit 140, and a mode determination unit 150. The first control unit 120 simultaneously implements, for example, functions by artificial intelligence (AI) and functions by a model given in advance. For example, a function of "recognizing an intersection" may be implemented by simultaneously executing recognition of an intersection by deep learning or the like and recognition based on conditions given in advance (a signal, a road sign, and the like that can be used for pattern matching) and scoring both recognitions to comprehensively evaluate the recognitions. Accordingly, the reliability of autonomous driving is secured.

The recognition unit 130 recognizes a position and a state such as a speed or an acceleration of an object in the surroundings of the host vehicle M on the basis of information input from the camera 10, the radar device 12, and the LIDAR 14 via the object recognition device 16. A position of an object is recognized as, for example, a position on absolute coordinates with a representative point (a center of gravity, a drive axis center, or the like) of the host vehicle M as an origin and is used for control. The position of the object may be represented as a representative point such as a center of gravity or a corner of the object or may be represented as a region. A "state" of an object may include an acceleration or a jerk of an object or an "action state" of an object (for example, whether an object is changing a lane or is about to change a lane).

The recognition unit 130 recognizes, for example, a lane (traveling lane) on which the host vehicle M is traveling. For example, the recognition unit 130 recognizes a traveling lane by comparing a pattern (hereinafter, referred to as a "map road marking") of a road marking obtained from the second map information 62 with a pattern (hereinafter, referred to as a "camera road marking") of a road marking in the surroundings of the host vehicle M recognized from an image captured by the camera 10. More specifically, the determination unit 132 of the recognition unit 130 calculates, for example, a deviation between the map road marking and the camera road marking, and in a case where determination is made that the calculated deviation is equal to or less than a prescribed value (that is, in a case where the map road marking and the camera road marking match each other), recognizes at least one (or a center line) of the map road marking and the camera road marking as a traveling lane. Here, the deviation may be, for example, an angle between the map road marking and the camera road marking or may be a distance between the map road marking and the camera road marking. In calculating the distance between the map road marking and the camera road marking, for example, one or more representative points may be extracted from each of the map road marking and the camera road marking in a prescribed range in the moving direction of the host vehicle M, and a distance between the representative points may be defined as a deviation. The recognition unit 130 may recognize a traveling lane by recognizing a road boundary including a road marking, a road shoulder, a curbstone, a median strip, a guard rail, and the like, instead of a road marking. In the recognition, the position of the host vehicle M acquired from the navigation device 50 or a processing result by the INS may be taken into consideration. The recognition unit 130 recognizes a temporary stop line, an obstacle, a red signal, a toll gate, and other road events.

In recognizing a traveling lane, the recognition unit 130 recognizes a position or a posture of the host vehicle M with respect to the traveling lane. The recognition unit 130 may recognize a deviation of a reference point of the host vehicle M from the center of the lane and an angle with respect to a line in which the center of the lane in the moving direction of the host vehicle Mis aligned, as a relative position and a posture of the host vehicle M with respect to the traveling lane. Alternatively, the recognition unit 130 may recognize a position or the like of the reference point of the host vehicle M with respect to any side end portion (road marking or road boundary) of the traveling lane as a relative position of the host vehicle M with respect to the traveling lane.

The action plan generation unit 140 basically travels on a recommended lane determined by the recommended lane determination unit 61, and generates a target trajectory along which the host vehicle M will autonomously travel (without depending on an operation of the driver) in the future to avoid an approach to an object (excluding an object such as a road marking, a road sign, or a manhole that the vehicle can climb over) recognized by the recognition unit 130. For example, the recognition unit 130 sets a risk region centered on an object of which the state is output, and in the risk region, a risk is set by the recognition unit 130 as an index value indicating a degree to which the host vehicle M is not to approach. The action plan generation unit 140 generates a target trajectory such that the host vehicle M does not pass through a point where the risk is equal to or greater than a prescribed value and travels in the recognized traveling lane. Since the object includes a moving object, the distribution of the risk is not one per control cycle, and is set for a plurality of future time points in consideration of a future position of the object predicted on the basis of a speed of the object. For example, the target trajectory is expressed by sequentially arranging points (trajectory points) that the host vehicle M will reach. The trajectory points are points that the host vehicle M will reach at each prescribed traveling distance (for example, about several [m]) in a road distance, and separately, a target speed and a target acceleration at each prescribed sampling time (for example, about several tenths of a [sec]) are generated as a part of the target trajectory. The trajectory points may be positions that the host vehicle M will reach within a prescribed sampling time at each sampling time. In this case, information on the target speed or the target acceleration is expressed by an interval of the trajectory points.

In addition, in the present embodiment, in a case where the determination unit 132 determines that the map road marking and the camera road marking match each other on only one side, the action plan generation unit 140 generates a target trajectory such that the host vehicle M travels along (in consideration of at least) the map road marking and the camera road marking matching each other. As an example, the action plan generation unit 140 generates a target trajectory such that the host vehicle M travels at a point shifted by a prescribed distance from the map road marking and the camera road marking matching each other.

The action plan generation unit 140 may set an event of autonomous driving in generating the target trajectory. The event of autonomous driving includes a constant speed traveling event, a low speed following traveling event, a lane change event, a branching event, a merging event, a takeover event, and the like. The action plan generation unit 140 generates a target trajectory according to an activated event.

The mode determination unit 150 determines a driving mode of the host vehicle M to any of a plurality of driving modes in which tasks imposed on the driver are different. FIG. 3 is a diagram showing an example of a correspondence relationship of a driving mode, a control state of the host vehicle M, and a task. The driving mode of the host vehicle Mis, for example, five modes of a mode A to a mode E. The control state, that is, a degree of automation of driving control of the host vehicle M is highest in the mode A, decreases in the order of the mode B, the mode C, and the mode D, and is lowest in the mode E. In contrast, the task imposed on the driver is lightest in the mode A, gets heavier in the order of the mode B, the mode C, and the mode D, and is heaviest in the mode E. In the modes D and E, since the control state is not autonomous driving, the autonomous driving control device 100 is responsible for ending control related to autonomous driving and shifting to driving assistance or manual driving. Hereinafter, the contents of each driving mode will be illustrated.

In the mode A, the vehicle is in a state of autonomous driving, and neither front monitoring nor gripping (in the drawing, steering gripping) of the steering wheel 82 is imposed on the driver. However, even in the mode A, the driver is required to be in a posture capable of quickly shifting to manual driving in response to a request from a system centered on the autonomous driving control device 100. The autonomous driving as used herein means that both steering and acceleration/deceleration are controlled without depending on a driver's operation. The front means a space in the moving direction of the host vehicle M to be visually recognized via the front windshield. The mode A is, for example, a driving mode that can be executed in a case where a condition that the host vehicle M is traveling at a prescribed speed (for example, about 50 [km/h] or less) on an expressway such as a highway, and a following target preceding vehicle is present is satisfied, and may be called traffic jam pilot (TJP). In a case where the condition is not satisfied, the mode determination unit 150 changes the driving mode of the host vehicle M to the mode B.

In the mode B, the vehicle is in a state of driving assistance, and a task (hereinafter, referred to as front monitoring) of monitoring the front of the host vehicle M is imposed on the driver, but a task of gripping the steering wheel 82 is not imposed on the driver. In the mode C, the vehicle is in a state of driving assistance, and the task of front monitoring and the task of gripping the steering wheel 82 are imposed on the driver. The mode D is a driving mode in which the driver is required to perform a driving operation of a certain degree in relation to at least one of steering and acceleration/deceleration of the host vehicle M. For example, in the mode D, driving assistance such as adaptive cruise control (ACC) or lane keeping assist system (LKAS) is performed. In the mode E, the vehicle is in a state of manual driving in which the driver is required to perform a driving operation in relation to both steering and acceleration/deceleration. In both the mode D and the mode E, the task of monitoring the front of the host vehicle M is of course imposed on the driver.

The driving mode is not limited to the modes illustrated in FIG. 3, and may be specified by other definitions. For example, in a driving mode in which both front monitoring and steering gripping are required, a threshold for determination that the steering wheel is gripped may be loose or severe. More specifically, while the driver may touch the steering wheel 82 with any of right and left hands in a certain driving mode, in another driving mode in which the task imposed on the driver is heavier, the driving mode may be defined such that the driver is required to grip the steering wheel 82 with both hands at a strength of the threshold or more. In addition, driving modes in which the heaviness of the task imposed on the driver is different may be defined in any way.

The autonomous driving control device 100 (and a driving assistance device (not shown)) executes automated lane change according to a driving mode. The automated lane change includes automated lane change (1) according to a system request and automated lane change (2) according to a driver request. The automated lane change (1) includes automated lane change for passing and is performed in a case where a speed of a preceding vehicle is slower than the speed of the host vehicle by a reference or the more, and automated lane change for moving toward a destination (automated lane change due to a change in recommended lane). The automated lane change (2) involves making the host vehicle M change the lane toward in an operation direction when a direction indicator is operated by the driver in a case where a condition regarding a speed or a positional relationship with a surrounding vehicle is satisfied.

The autonomous driving control device 100 does not execute either of the automated lane change (1) or (2) in the mode A. The autonomous driving control device 100 executes both the automated lane changes (1) and (2) in the modes B and C. The driving assistance device (not shown) does not execute the automated lane change (1) and executes the automated lane change (2) in the mode D. In the mode E, both the automated lane changes (1) and (2) are not executed.

The mode determination unit 150 changes the driving mode of the host vehicle M to a driving mode in which the task is heavier in a case where the task related to the determined driving mode (hereinafter, referred to as a current driving mode) is not executed by the driver.

For example, in a case where the driver is in a posture where the driver cannot shift to manual driving in response to a request from the system in the mode A (for example, in a case where the driver continues to look outside a permissible area or in a case where a sign that driving becomes difficult is detected), the mode determination unit 150 performs control for prompting the driver to shift to manual driving using the HMI 30. When the driver does not respond, the mode determination unit 150 performs control such that the host vehicle M is moved closer to a road shoulder and is gradually stopped, and autonomous driving is stopped. After the autonomous driving is stopped, the host vehicle is in the mode D or E, and the host vehicle M can be started by a manual operation of the driver. Hereinafter, the same applies to "stopping of autonomous driving". In a case where the driver is not monitoring the front in the mode B, the mode determination unit 150 performs control for prompting the driver to monitor the front using the HMI 30. When the driver does not respond, the mode determination unit 150 performs control such that the host vehicle M is moved closer to a road shoulder and is gradually stopped, and autonomous driving is stopped. In the mode C, in a case where the driver is not monitoring the front or in a case where the driver is not gripping the steering wheel 82, the mode determination unit 150 performs control for prompting the driver to monitor the front and/or to grip the steering wheel 82 using the HMI 30. When the driver does not respond, the mode determination unit 150 performs control such that the host vehicle M is moved closer to a road shoulder and is gradually stopped, and autonomous driving is stopped.

The mode determination unit 150 further monitors a state of the driver to perform the mode change and determines whether the state of the driver is a state according to the task. For example, the mode determination unit 150 analyzes an image captured by the driver monitor camera 70 to execute posture estimation processing and determines whether the driver is in a posture where the driver cannot shift to manual driving in response to a request from the system. The mode determination unit 150 analyzes an image captured by the driver monitor camera 70 to execute line-of-sight estimation processing and determines whether the driver is monitoring the front.

In the present embodiment, in a case where the determination unit 132 determines that the map road marking and the camera road marking do not match each other on both sides, the mode determination unit 150 changes the driving mode of the host vehicle M to a driving mode in which the task is heavier. For example, in a case where determination is made that the map road marking and the camera road marking do not match each other on both sides while the host vehicle M is traveling in a driving mode (the mode A or the mode B) in which steering gripping is not required, the mode determination unit 150 changes the driving mode to a mode of the mode C or lower.

In the present embodiment, in a case where the determination unit 132 determines that the map road marking and the camera road marking match each other on only one side while the host vehicle M is traveling in a driving mode (the mode A or the mode B) in which steering gripping is not required, the mode determination unit 150 continues the driving mode of the mode A or the mode B unless a condition for determining the deviation described below is satisfied. In this case, as described above, the action plan generation unit 140 generates a target trajectory along the map road marking or the camera road marking matching each other.

The mode determination unit 150 further executes various kinds of processing for the mode change. For example, the mode determination unit 150 instructs the action plan generation unit 140 to generate a target trajectory for stopping at a road shoulder, instructs the driving assistance device (not shown) to operate, or controls the HMI 30 to prompt the driver to perform an action.

The second control unit 160 controls the traveling drive power output device 200, the brake device 210, and the steering device 220 such that the host vehicle M passes the target trajectory generated by the action plan generation unit 140 at a scheduled time.

Returning to FIG. 2, the second control unit 160 includes, for example, an acquisition unit 162, a speed control unit 164, and a steering control unit 166. The acquisition unit 162 acquires information on the target trajectory (trajectory points) generated by the action plan generation unit 140 and stores the acquired information in a memory (not shown). The speed control unit 164 controls the traveling drive power output device 200 or the brake device 210 on the basis of a speed element associated with the target trajectory stored in the memory. The steering control unit 166 controls the steering device 220 according to a degree of curving of the target trajectory stored in the memory. The processing of the speed control unit 164 and the steering control unit 166 is implemented by, for example, a combination of feedforward control and feedback control. As an example, the steering control unit 166 executes feedforward control according to a curvature of a road in front of the host vehicle M and feedback control based on a deviation from the target trajectory in combination.

The traveling drive power output device 200 outputs traveling drive power (torque) for a vehicle to travel to drive wheels. The traveling drive power output device 200 includes, for example, a combination of an internal combustion engine, an electric motor, a transmission, and the like, and an electronic control unit (ECU) that controls the internal combustion engine, the electric motor, the transmission, and the like. The ECU controls the above-described configuration according to information input from the second control unit 160 or information input from the driving operation member 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the second control unit 160 or information input from the driving operation member 80 such that brake torque according to a braking operation is output to each wheel. The brake device 210 may include, as a backup, a mechanism that transmits hydraulic pressure generated by an operation of a brake pedal included in the driving operation member 80 to the cylinder via a master cylinder. The brake device 210 is not limited to the configuration described above, and may be an electronically controlled hydraulic brake device that controls an actuator according to information input from the second control unit 160 to transmit hydraulic pressure of the master cylinder to the cylinder.

The steering device 220 includes, for example, a steering ECU and an electric motor. The electric motor applies force to a rack-and-pinion mechanism to change a direction of turning wheels. The steering ECU drives the electric motor according to information input from the second control unit 160 or information input from the driving operation member 80 and changes the direction of the turning wheels.

Processing in Matching on One Side

As described above, the determination unit 132 compares the map road marking and the camera road marking on both sides, and in a case where determination is made that the map road marking and the camera road marking match each other on at least one side, the action plan generation unit 140 generates a target trajectory such that the host vehicle M travels along the map road marking and the camera road marking matching each other. In contrast, for example, in a case where the camera road marking and the map road marking do not match each other on one side, the camera road marking and the map road marking match each other on only the other side, and thereafter, a deviation is generated between the camera road marking and the map road marking on the matched side, in the related art, the level of the driving mode may be frequently lowered. As a result, for example, the level of a driving mode (the mode A or the mode B) in which steering gripping is not required is lowered to a driving mode (a driving mode of the mode C or lower) in which steering gripping is required, and an occupant may feel discomfort.

Figure 4:
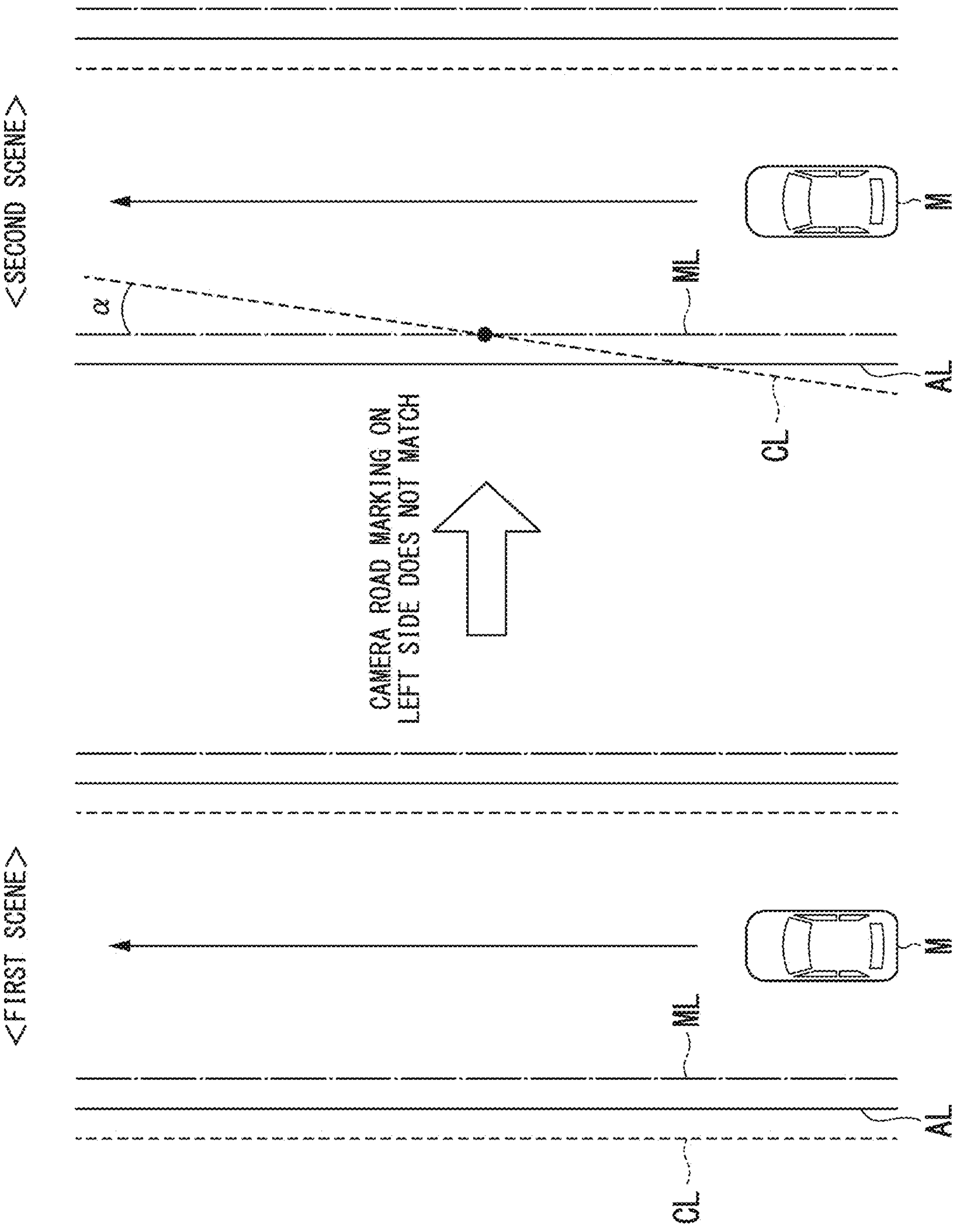
FIG. 4 is a diagram illustrating a scene to which a technique according to the embodiment of the present invention is applied.

FIG. 4 is a diagram illustrating a scene to which the technique according to the embodiment of the present invention is applied. In a left portion of FIG. 4, a symbol CL represents a camera road marking, a symbol ML represents a map road marking, and a symbol AL represents an actual road marking. The left portion of FIG. 4 shows, as a first scene, a scene where the determination unit 132 determines that the map road marking ML and the camera road marking CL match each other on both sides, and the host vehicle M is traveling in a driving mode of the mode B in which steering gripping is not required.

Thereafter, in a second scene shown in a right portion of FIG. 4, it is assumed that an angle difference $\alpha$ between the camera road marking CL and the map road marking ML on a left side is equal to or greater than a prescribed value. In this case, the determination unit 132 determines that the map road marking ML and the camera road marking CL match each other on only a right side, and the mode determination unit 150 determines to continue the driving mode of the mode B based on the map road marking ML or the camera road marking CL on the right side. Here, the driving mode of the mode B based on the map road marking ML or the camera road marking CL means that the action plan generation unit 140 generates a target trajectory of the host vehicle M using at least one of the map road marking ML and the camera road marking CL.

Figure 5:
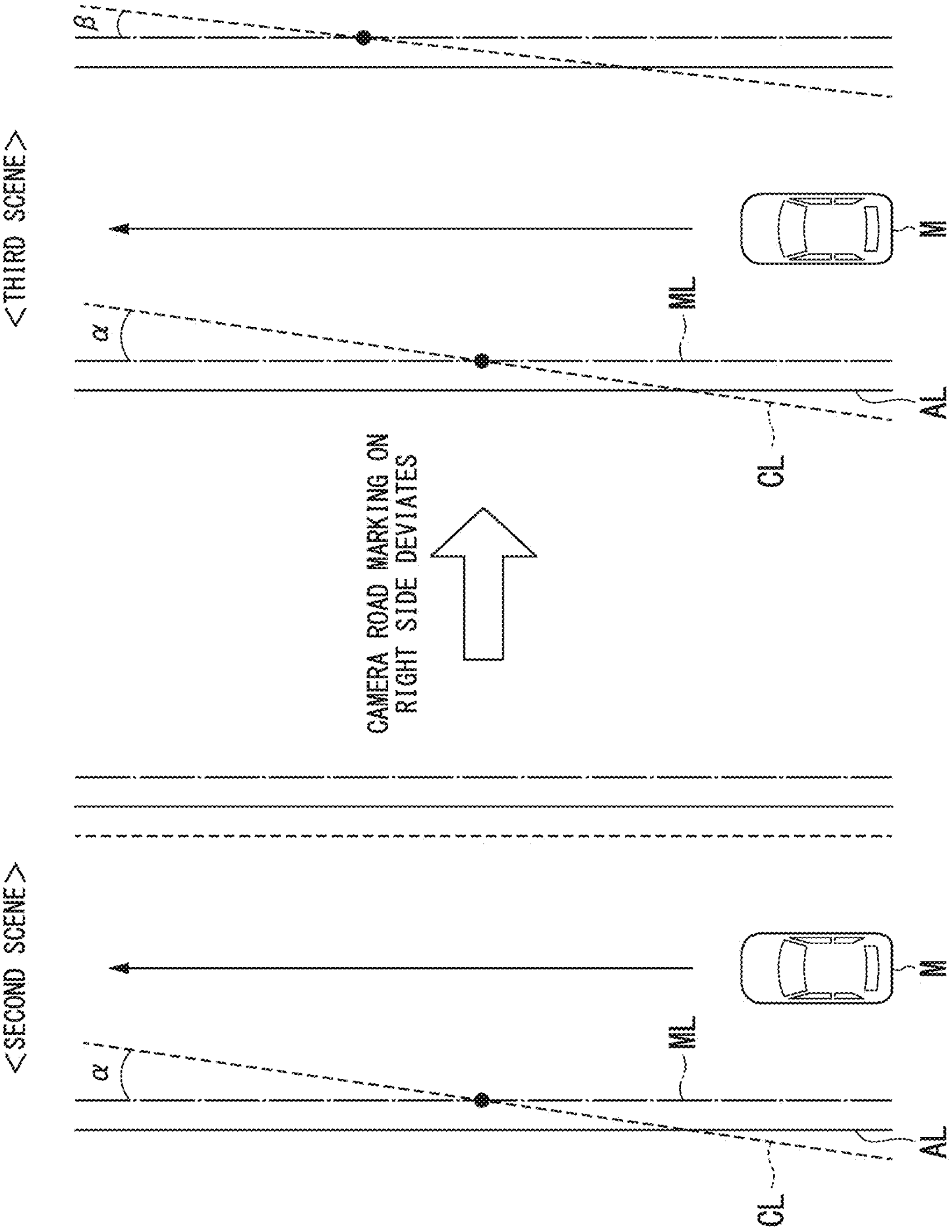
FIG. 5 is a diagram illustrating a next scene to which the technique according to the embodiment of the present invention is applied.

FIG. 5 is a diagram illustrating a next scene to which the technique according to the embodiment of the present invention is applied. A second scene shown in a left portion of FIG. 5 is the same scene as the second scene shown in the right portion of FIG. 4. Thereafter, in a third scene shown in a right portion of FIG. 5, the determination unit 132 detects, as a deviation, an angle difference β between the camera road marking CL 5 and the map road marking ML on the matched right side. The determination unit 132 determines whether the angle difference β is equal to or greater than a first threshold Th, and in a case where determination is made that the angle difference β is equal to or greater than the first threshold Th, the mode determination unit 150 changes the driving mode from the mode B to the mode C. On the other hand, in a case where determination is made that the angle difference β is less than the first threshold Th, the mode determination unit 150 continues the driving mode of the mode B. The first threshold Th is an example of a "condition for determining a deviation".

In this way, in a case where the angle difference β is equal to or greater than the first threshold Th, the driving mode is changed from the mode B to the mode C, so that the safety of autonomous driving is secured. Here, to secure the safety of autonomous driving, it is desirable to change the condition such that the deviation is more easily determined as the speed of the host vehicle M is higher. On the other hand, to secure the continuity of autonomous driving, it is desirable to change the condition such that the deviation is less likely to be determined as the speed of the host vehicle M is lower. This is because the driver has a smaller allowance to steer the steering wheel and prevent lane departure of the host vehicle M as the speed of the host vehicle M is higher, but the driver has a greater allowance to steer the steering wheel and prevent lane departure of the host vehicle M as the speed of the host vehicle M is lower. For this reason, in the present embodiment, the determination unit 132 changes the value of the first threshold Th to be smaller (greater) as the speed of the host vehicle M is higher (lower).

Figure 6:
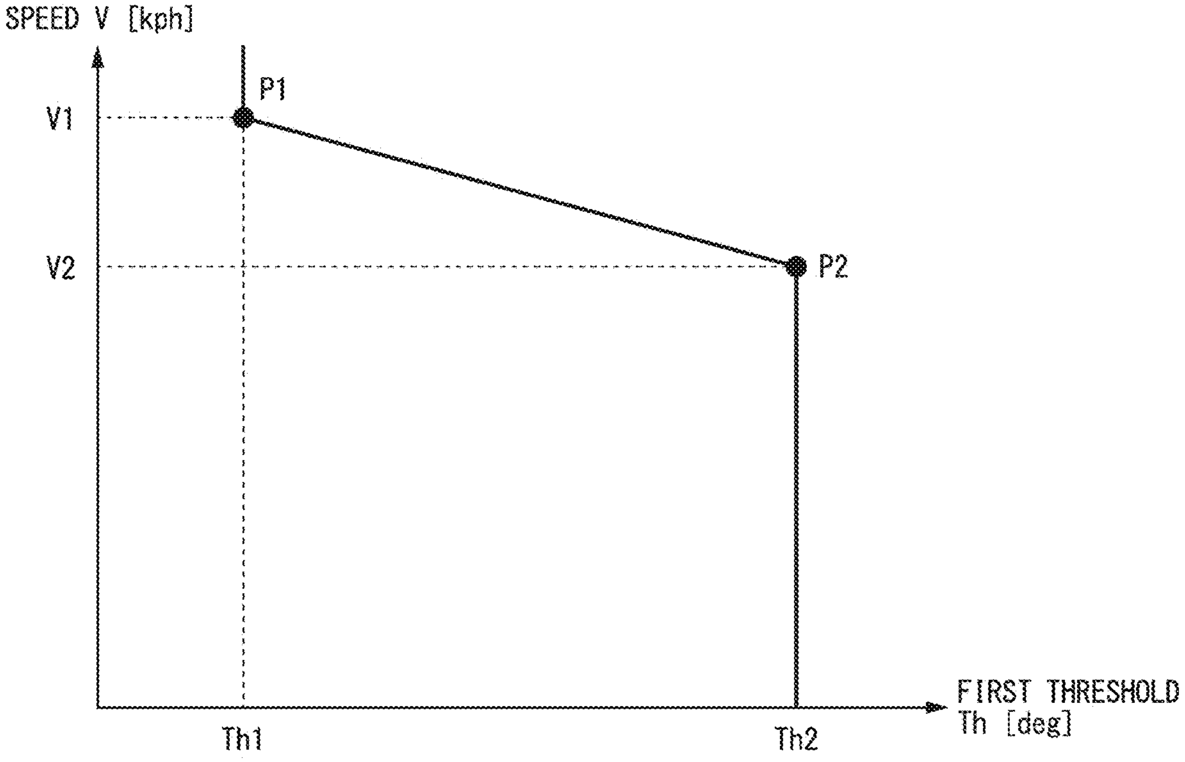
FIG. 6 is a graph showing an example of a method for changing a first threshold by a determination unit.

FIG. 6 is a graph showing an example of a method for changing the first threshold Th by the determination unit 132. In the graph shown in FIG. 6, the vertical axis represents a speed V [kph], and the horizontal axis represents the first threshold Th [deg]. As shown in FIG. 6, for example, in a case where the speed V of the host vehicle M is equal to or higher than a first speed V1, the determination unit 132 sets the first threshold Th to a first set value Th1. Thereafter, in a case where the speed V of the host vehicle M decreases and falls within a range lower than the first speed V1 and equal to or higher than a second speed V2, the determination unit 132 decreases the first threshold Th from the first set value Th1. Thereafter, in a case where the speed V of the host vehicle M reaches the second speed V2, thereafter, even when the speed V of the host vehicle M decreases, the determination unit 132 sets the first threshold Th to a second set value Th2. With this, in a case where the speed V of the host vehicle M is high, the first threshold Th is set to be small to secure the safety of autonomous driving, and in a case where the speed V of the host vehicle M is low, the first threshold Th is set to be large to secure the continuity of autonomous driving. In addition, the first threshold Th is fixed to at most a given value (that is, the second set value Th2), such that a function as the first threshold Th is secured at minimum, and while the vehicle is traveling in a very low-speed region, it is possible to prevent traveling control with low accuracy from being continued.

As described above, in a case where determination is made that the angle difference β is less than the first threshold Th, the driving mode of the mode B is continued. In this case, generating a target trajectory on the basis of any of the camera road marking CL and the map road marking ML may cause a problem. For example, the determination unit 132 may verify the reliability of the camera road marking CL, and in a case where determination is made that the camera road marking CL is reliable, the action plan generation unit 140 may continue the driving mode of the mode B based on the camera road marking CL. More specifically, on an assumption that determination is made that the angle difference β between the camera road marking CL and the map road marking ML on the matched side is equal to or greater than the first threshold Th, the angle difference α between the camera road marking CL and the map road marking ML on the other side and the angle difference β are equal to or greater than a second threshold, and the two angle differences α and β are angle differences in the same direction, the determination unit 132 may generate a target trajectory on the basis of the camera road marking CL, and may continue the driving mode of the mode B. Here, the two angle differences α and β in the same direction means that the order of the camera road marking CL and the map road marking ML of the angle difference is the same clockwise.

Figure 7:
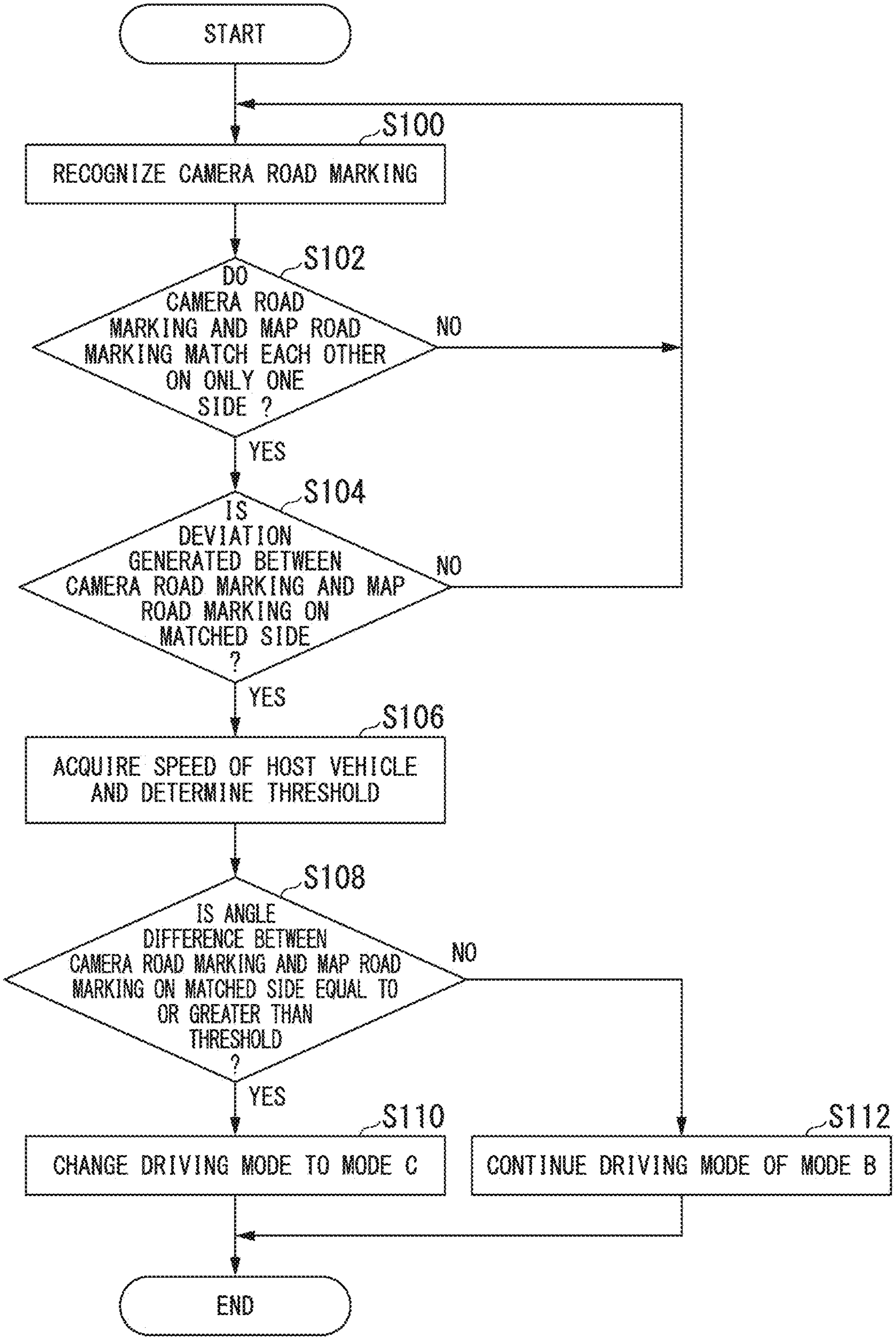
FIG. 7 is a flowchart illustrating an example of a flow of processing that is executed by an autonomous driving control device.

Next, a flow of processing that is executed by the autonomous driving control device 100 will be described with reference to FIG. 7. FIG. 7 is a flowchart illustrating an example of a flow of processing that is executed by the autonomous driving control device 100. The processing of the flowchart shown in FIG. 7 is repeatedly executed when the host vehicle M is traveling in the driving mode of the mode B in which steering gripping is not required, for example.

First, the recognition unit 130 recognizes the camera road marking of the lane on which the host vehicle M travels (Step S100). Next, the determination unit 132 determines whether the camera road marking and the map road marking match each other on only one side (Step S102). In a case where determination is made that the camera road marking and the map road marking do not match each other on only one side, the determination unit 132 returns the process to Step S100.

In a case where determination is made that the camera road marking and the map road marking match each other on only one side, the determination unit 132 determines whether a deviation is generated between the camera road marking and the map road marking on the matched side (Step S104). In a case where determination is made that a deviation is not generated between the camera road marking and the map road marking on the matched side, the determination unit 132 returns the process to Step S100. On the other hand, in a case where determination is made that a deviation is generated between the camera road marking and the map road marking on the matched side, the determination unit 132 acquires the speed of the host vehicle M from the vehicle sensor 40 and determines the first threshold Th according to the acquired speed (Step S106).

Next, the determination unit 132 determines whether the angle difference between the camera road marking and the map road marking on the matched side is equal to or greater than the first threshold (Step S108). In a case where the angle difference between the camera road marking and the map road marking on the matched side is equal to or greater than the first threshold, the mode determination unit 150 changes the driving mode from the mode B to the mode C (Step S110). On the other hand, in a case where determination is made that the angle difference between the camera road marking and the map road marking on the matched side is less than the first threshold, the mode determination unit 150 continues the driving mode of the mode B (Step S112). With this, the processing of this flowchart ends.

Figure 8:
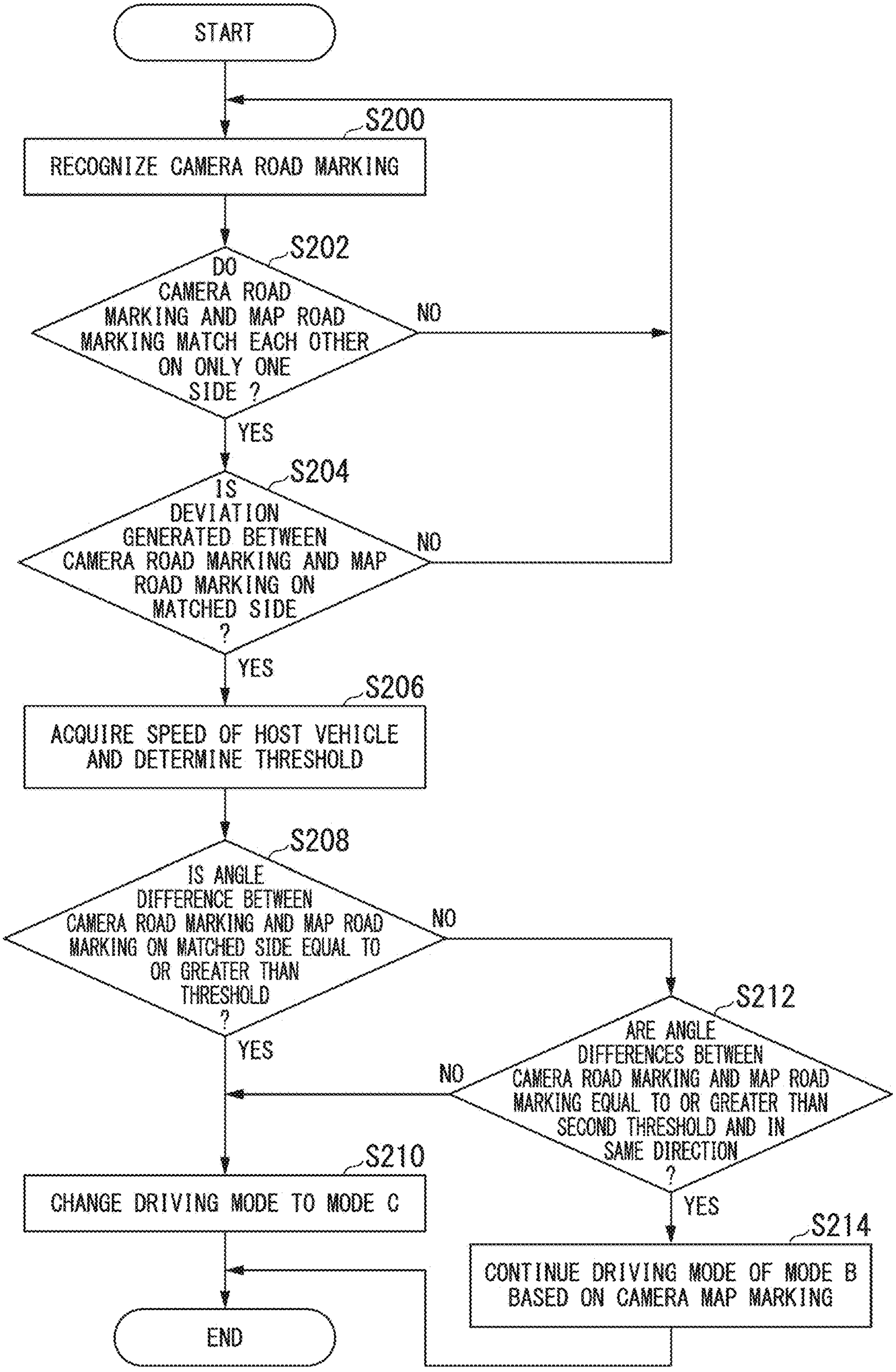
FIG. 8 is a flowchart illustrating an example of a flow of processing that is executed by the autonomous driving control device.

FIG. 8 is a flowchart illustrating another example of a flow of processing that is executed by the autonomous driving control device 100. Similarly to FIG. 7, the processing of the flowchart shown in FIG. 8 is repeatedly executed when the host vehicle M is traveling in the driving mode of the mode B in which steering gripping is not required, for example. Since processing of Steps S200 to S208 is similar to the processing of Steps S100 to S108, description will not be repeated.

In Step S208, in a case where determination is made that the angle difference between the camera road marking and the map road marking on the matched side is less than the first threshold, the determination unit 132 determines whether the angle difference between the camera road marking and the map road marking on the matched side and the angle difference between the camera road marking and the map road marking on the other side are equal to or greater than the second threshold and are in the same direction (Step S212). In a case where the angle difference between the camera road marking and the map road marking on the matched side and the angle difference between the camera road marking and the map road marking on the other side are equal to or greater than the second threshold and are in the same direction, the action plan generation unit 140 continues the driving mode of the mode B based on the camera road marking (Step S214). On the other hand, in a case where determination is made that the angle difference between the camera road marking and the map road marking on the matched side and the angle difference between the camera road marking and the map road marking on the other side are not equal to or greater than the second threshold or are not in the same direction, the determination unit 132 returns the process to Step S210. With this, the processing of this flowchart ends.

The embodiment and the flowcharts described above, it is assumed that the driving mode of the host vehicle M is the mode B in which steering gripping is not required. It should be noted that the present invention is not limited to such a configuration, and more generally, the present invention can be applied in determining whether to change a mode of autonomous driving or driving assistance to a driving mode in which the task is heavier for the driver.

According to the present embodiment described above, in a case where the camera road marking and the map road marking match each other on only one side, and a deviation is generated, the condition for determining the deviation is changed according to the speed of the host vehicle. With this, it is possible to secure the stability of autonomous driving.

The above-described embodiment can be expressed as follows.

A vehicle control device including a storage medium that stores computer-readable instructions, and a processor connected to the storage medium, in which the processor executes the computer-readable instructions to recognize a road marking present in a moving direction of a vehicle, determine whether the recognized road marking and a map road marking based on map information stored in a storage unit match each other and determine a deviation between the road marking and the map road marking matching each other, perform traveling control of the vehicle, and change a condition for determining the deviation according to a speed of the vehicle.

While a mode for carrying out the present invention has been described using the embodiment, the present invention is not limited to such an embodiment, and various modifications and replacements can be made without departing from the spirit of the present invention.

What is claimed is:

1. A vehicle control device comprising:

a storage medium that stores computer-readable instructions; and a processor connected to the storage medium, wherein the processor executes the computer-readable instructions to recognize a road marking present in a moving direction of a vehicle, determine whether the recognized road marking and a map road marking based on map information stored in a storage unit match each other and determine a deviation between the road marking and the map road marking matching each other, and perform traveling control of the vehicle, and the processor changes a condition for determining the deviation according to a speed of the vehicle, wherein the condition is a threshold to be compared with the deviation, and the processor changes the threshold according to the speed such that the deviation is less likely to be determined to hold true as the speed of the vehicle is lower.

2. The vehicle control device according to claim 1, wherein the processor changes the condition such that the deviation is less likely to be determined to hold true according to the speed of the vehicle in a case where the speed is equal to or lower than a first speed and equal to or higher than a second speed lower than the first speed, and sets the condition to be the same in a case where the speed is lower than the second speed.

3. The vehicle control device according to claim 1, wherein, in a state in which determination is made that the road marking and the map road marking match each other on only one side, the processor changes a condition for determining a deviation between the road marking and the map road marking on the one side.

4. The vehicle control device according to claim 3, wherein the condition has a first threshold regarding an angle difference between the road marking and the map road marking on the one side, and the processor changes the first threshold according to the speed.

5. The vehicle control device according to claim 4, wherein, in a case where determination is made that the angle difference is equal to or greater than the first threshold, both a first angle difference between the road marking and the map road marking on the one side and a second angle difference between the road marking and the map road marking on the other side are equal to or greater than a second threshold, and the first angle difference and the second angle difference are angle differences in the same direction, the processor performs traveling control of the vehicle according to the recognized road marking.

6. A vehicle control method comprising:

by a computer mounted in a vehicle, recognizing a road marking present in a moving direction of the vehicle, determining whether the recognized road marking and a map road marking based on map information stored in a storage unit match each other and determining a deviation between the road marking and the map road marking matching each other;

performing traveling control of the vehicle; and changing a condition for determining the deviation according to a speed of the vehicle, wherein the condition is a threshold to be compared with the deviation, and the computer changes the threshold according to the speed such that the deviation is less likely to be determined to hold true as the speed of the vehicle is lower.

7. A computer-readable non-transitory storage medium storing a program for causing a computer mounted in a vehicle to:

recognize a road marking present in a moving direction of the vehicle, determine whether the recognized road marking and a map road marking based on map information stored in a storage unit match each other and determine a deviation between the road marking and the map road marking matching each other;

perform traveling control of the vehicle; and change a condition for determining the deviation according to a speed of the vehicle, wherein the condition is a threshold to be compared with the deviation, and the computer changes the threshold according to the speed such that the deviation is less likely to be determined to hold true as the speed of the vehicle is lower.

* * * * *